Dec. 14, 1965   W. J. GILMORE ETAL   3,222,858
TWISTED CABLE ASSEMBLY AND METHOD
OF MAKING THE ASSEMBLY
Filed Sept. 13, 1963   2 Sheets-Sheet 1

INVENTORS
WILLIAM J. GILMORE
LILBURN L. MESLER
BY
Pennie, Edmonds, Morton, Taylor & Adams
ATTORNEYS Dec. 14, 1965
W. J. GILMORE ETAL
3,222,858
TWISTED CABLE ASSEMBLY AND METHOD
OF MAKING THE ASSEMBLY
Filed Sept. 13, 1963
2 Sheets-Sheet 2
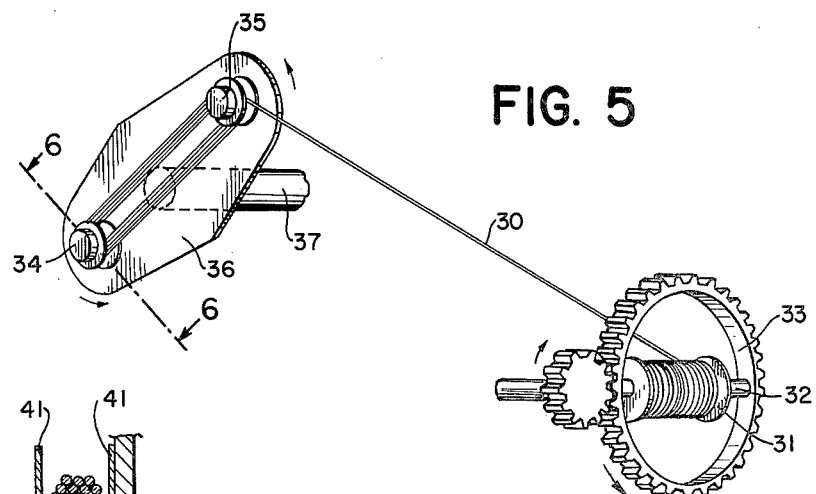
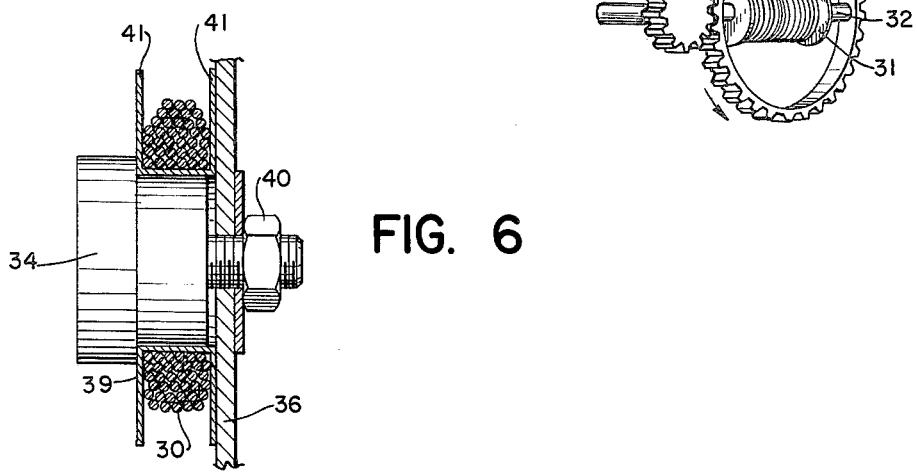
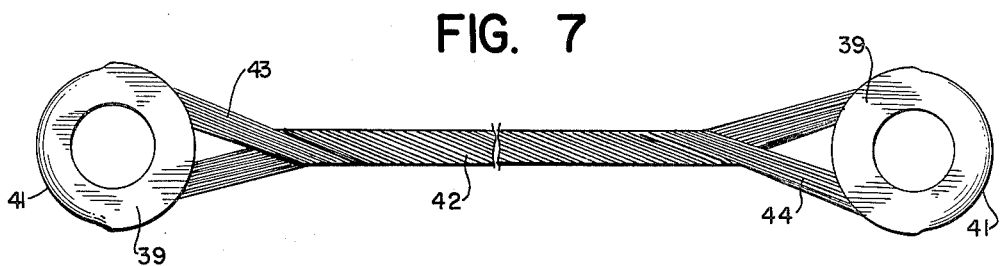
INVENTORS
WILLIAM J. GILMORE
LILBURN L. MESLER
BY
ATTORNEYS United States Patent Office 3,222,858
Patented Dec. 14, 1965

3,222,858
TWISTED CABLE ASSEMBLY AND METHOD
OF MAKING THE ASSEMBLY
William J. Gilmore, Manitou Beach, and Lilburn L. Mesler, Palmyra, Mich., assignors to American Chain & Cable Company, Inc., New York, N.Y., a corporation of New York
Filed Sept. 13, 1963, Ser. No. 308,779
5 Claims. (Cl. 57—141)

This invention relates to twisted wire cable assemblies and, more particularly, to a length of twisted wire cable integrally formed with closed loops at each end, and also to a method of making such an assembly.

It is intended that this invention have particular, though not exclusive, applicability to the manufacture of relatively short lengths of cable which are to be secured at both ends for operation under conditions of tensile stress. Any length of wire cable anchored at its opposite ends to operate under tension must of course be equipped with some kind of end attachment means. The conventional practice has been to attach otherwise separate and distinct end fittings to the cable by techniques involving swaging, crimping or the like. When the over-all length of the cable is quite extensive, the relative cost of such separate end fittings is not too significant but if the section of cable between the fittings is short, say a matter of inches, then a large part of the total cost may result solely from the manufacture and attachment of the fittings. In addition, it is common experience that the weakest points in a twisted wire cable anchored by end fittings swaged to its opposite ends is not in the cable itself but is at the connection between the fittings and the cable. Consequently, the optimum tensile strength of such a cable operating under tension is rarely used to advantage.

It is the general purpose of this invention to provide an entirely new wire cable assembly having end loops capable of ready attachment to various kinds of anchoring means and free of the serious disadvantages of conventional end fittings discussed above. The new cable assembly provides end loops which account for only a small fraction of the total cost even when a cable length between them is but a matter of inches. In addition to their economy, the end loops on the new cable assemblies are virtually as resistant to failure under tension as the remainder of the cable so that the optimum tensile strength of the cable can be used to advantage.

Broadly stated, the twisted cable assembly of the invention comprises at least one continuous length of wire disposed alongside itself in a plurality of substantially overlaid runs of similar configuration. These runs together described at least one pair of spaced closed loop sections and a corresponding pair of intermediate sections twisted longitudinally into a composite strand. The contemplated method of making this assembly comprises wrapping at least one continuous length of wire in a plurality of substantially overlaid runs of similar configuration which together describe at least one pair of end turn sections and a corresponding pair of intermediate sections. Thereafter, the intermediate sections of the runs of wire are longitudinally twisted into a composite strand with each end turn formed into a closed loop.

Preferred embodiments of the invention are described hereinbelow with reference to the accompanying drawings, wherein FIG. 1 illustrates one embodiment of the method wherein runs of the wire are laid together;

FIG. 5 is a schematic view illustrating another embodiment of the method wherein the wire is pre-twisted;

FIG. 6 is an enlarged section taken along the line 6—6 of FIG. 5; and

FIG. 7 is an enlarged view of the cable assembly produced by the FIG. 5 method.

Figure 1:
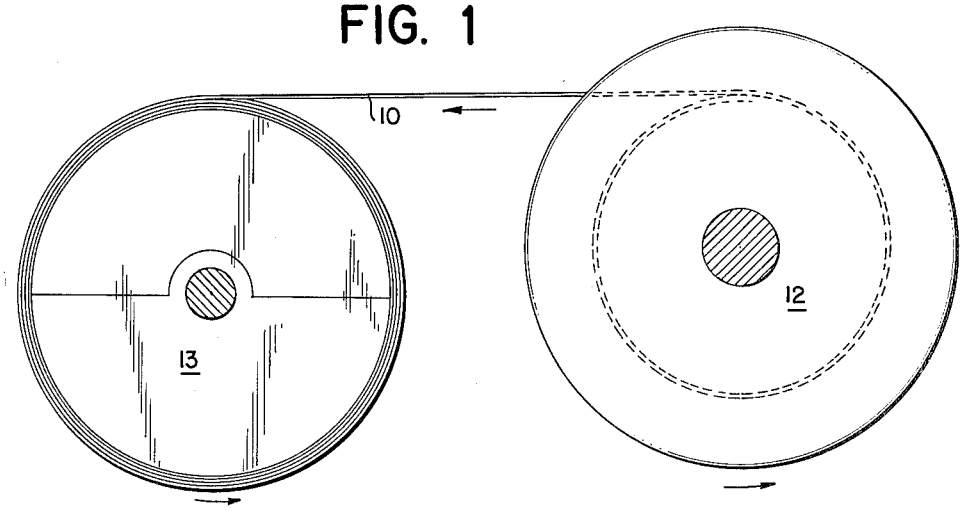
Figure 2:
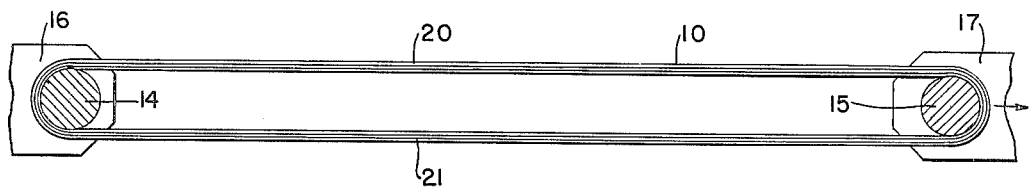
FIG. 2 illustrates the next step of this embodiment where the runs of the wire are wrapped between posts.
Figure 3:
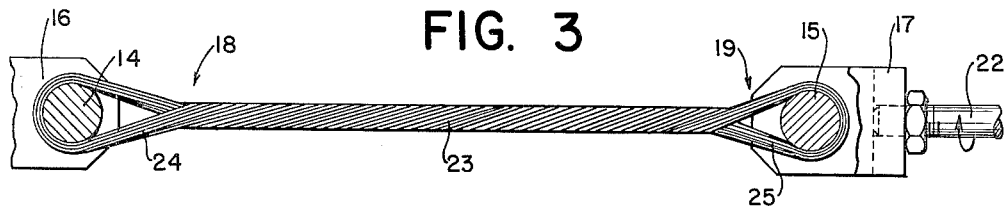
FIG. 3 illustrates the final step of this embodiment where the intermediate sections of the runs of the wire are twisted together.

In the embodiment of the method shown in FIGS. 1 to 3, a steel wire 10 of 0.10 inch diameter in the annealed condition is withdrawn from a spool 12 and wrapped about a split block 13. Approximately 100 turns of this wire are wound onto the split block 13 and the block is then dismantled. Thus, the continuous length of steel wire 10 can be removed and wrapped about spaced posts 14 and 15 projecting from elements 16 and 17 respectively, as shown in FIG. 2.

When wrapped about the posts 14 and 15, the wire 10 describes a plurality of substantially overlaid runs of similar configuration. These runs together describe a pair of end turn sections 18 and 19 and a corresponding pair of substantially paralled intermediate sections 20 and 21. As shown in FIG. 3, one of the elements, for example the element 17, includes means such as a shaft 22 for turning it and its associated post 15 with respect to the other element 17 and post 14. If the shaft 22 is turned as shown by the arrow in FIG. 3 while slight tension is applied between the posts 14 and 15, the intermediate sections 20 and 21 of the runs of the wire are twisted longitudinally together into a composite strand 23 as shown in FIG. 3. This twisting action should be carried out to the extent that the intermediate sections 20 and 21 are plastically deformed in the configuration of the composite strand 23 so that the strand will not untwist when the assembly is released from the posts. The two end turns 18 and 19 are thereby formed into closed lops 24 and 25 respectively extending integrally from the composite strand 23 therebetween.

Thereafter, the formed runs of the wire are removed from the posts 14 and 15 to provide a twisted cable assembly. The assembly comprises the continuous length of steel wire 10 in a plastically deformed state disposed alongside itself in a plurality of substantially overlaid runs of similar configuration. These runs together describe a pair of spaced closed loop sections 24 and 25 and a corresponding pair of intermediate sections twisted longitudinally into a composite strand 23.

Figure 4:
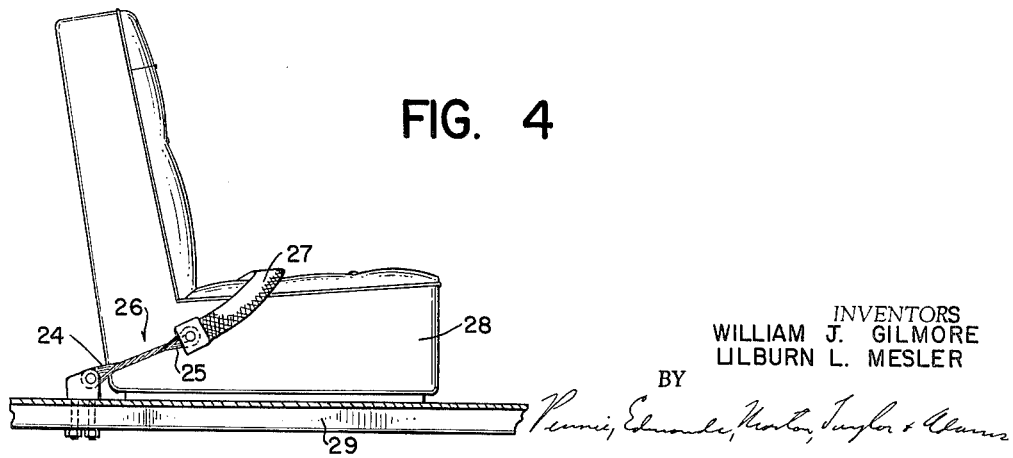
FIG. 4 illustrates a particular application of the cable assembly produced by the method of FIGS. 1 to 3.

One use for this cable assembly is illustrated in FIG. 4. Here the asembly 26 serves to connect a persennel seat belt 27 of an aircraft seat 28 to the structure 29 of the aircraft. The wires of the assembly in the plastically deformed state may have considerable extensibility under impact load so that in the event of abrupt deceleration of the aircraft the impact on the seat belt 27 will stretch the assembly 26 and absorb kinetic energy which otherwise might cause injury to the person in the seat 28. Because of the high strength of the end loops 24 and 25 on the assembly 26, it can withstand a greater shock load than a conventional cable of higher rated strength equipped with swaged end fittings.

Turning to FIG. 5 another method of forming the new cable assembly is illustrated. This embodiment is intended for use when the wire of the assembly is to be of high-tensile strength, perhaps in a drawn condition, without plastic deformation during manufacture of the assembly. Such wire cannot satisfactorily be made by the method of FIGS. 1 to 3 where the composite strand 23 tends to unwind if there is no plastic deformation during twisting of the intermediate sections 20 and 21. Consequently, in this embodiment a continuous length of steel wire 30 having a relatively high yield point is withdrawn from a spool 31 adapted to be revolved end-over-end in addition to being rotated axially. To illustrate this function schematically, the spool 31 in FIG. 5 is shown to be rotatably mounted on a shaft 32 mounted within a ring 33 which may be turned to revolve the spool 31 as the wire 30 is withdrawn. From the spool the wire 30 is wrapped about a pair of posts 34 and 35 projecting from a frame 36 which may be rotated by a shaft 37. As shown in FIG. 6, each post may include a removable grommet 39 to receive the wire 30, and each grommet may be attached for example by a nut 40. Peripheral portions 41 of the grommet 39 extend outwardly to a particularly great extent for purposes to be described hereinafter. The frame 36 is rotated by the shaft 37 and as the wire 30 is wrapped about the posts 34 and 35, it is also twisted elastically about its axis due to revolution of the spool 31 by means of the ring 33. On the posts 34 and 35, the elastically twisted wire 30 is in a plurality of substantially overlaid runs of similar configuration which together describe a pair of end turn sections and a corresponding pair of substantially parallel intermediate sections, similar to those described previously in reference to FIG. 2.

The next step in the FIG. 5 method is to remove the runs of the wire 30 from the posts 34 and 35 and to free the end turn sections with respect to one another. When this is done, the intermediate sections twist longitudinally as a result of the elastic axial twist imparted to the wire, thereby forming the intermediate sections into a composite twisted strand 42 with the end turns formed into closed loops 43 and 44, as shown in FIG. 7. To complete the assembly and to insure that the grommets 39 remain in the end loops 43 and 44, about half the peripheral portions 41 on each grommet are crimped down over the enclosed runs of the wire as shown in FIG. 7. By this method, the twist induced in the composite strand 42 is the direct result of the induced torsion in the wire 30 during winding and is not the result of forcible twisting as in the previous embodiment. Therefore, the high-tensile strength wire 30 remains in the elastically deformed condition even after the cable assembly is formed with no appreciable reduction in its load-bearing ability.

Various modifications of the product and method contemplated by this invention come within its scope. In particular, it is foreseen that more than one closed loop section may be produced at each end of the finished cable assembly by initially wrapping the runs of the wire about more than one pair of posts. This is only illustrative of contemplated variations since the extent of the invention is to be determined solely by the following claims.

We claim:

1. A method of making a twisted cable assembly which comprises elastically twisting a continuous length of wire about its axis, wrapping the elastically twisted wire between spaced posts in a plurality of substantially overlaid runs of similar configuration which together describe a pair of end turn sections and a corresponding pair of substantially parallel intermediate sections, removing said runs of the wire from said posts, and freeing said end turn sections with respect to one another so that the intermediate sections twist longitudinally as a result of the elastic axial twist in said wire, thereby forming said intermediate sections into a composite twisted strand with each end turn formed into a closed loop.

2. A method according to claim 1 wherein said wire is of steel.

3. In a twisted cable assembly which includes a continuous length of wire disposed alongside itself in a plurality of substantially overlaid runs of similar configuration, said runs describing a pair of spaced closed loop sections and a corresponding pair of intermediate sections longitudinally twisted into a composite strand; said assembly being improved in that said wire is in a condition of elastic torsional deformation about its own axis of a direction tending to maintain said intermediate section of the runs in their aforementioned longitudinally twisted state.

4. A twisted cable assembly according to claim 3 wherein said wire is of steel.

5. A twisted cable assembly according to claim 3 wherein an annular grommet is disposed in each of said loop sections.

References Cited by the Examiner

UNITED STATES PATENTS

| 188,442 | 3/1877 | Tobin | 189—31.5 |
| 998,360 | 7/1911 | Long | 57—27 |
| 2,109,717 | 3/1938 | Arnold | 57—158 |
| 2,736,398 | 2/1956 | Peterson | 57—141 X |
| 2,805,540 | 9/1957 | Thompson | 57—21 X |
| 3,079,192 | 2/1963 | Otley | 57—142 X |

FOREIGN PATENTS

| 468,595 | 7/1937 | Great Britain. |

MERVIN STEIN, *Primary Examiner.*